UNITED STATES PATENT OFFICE.

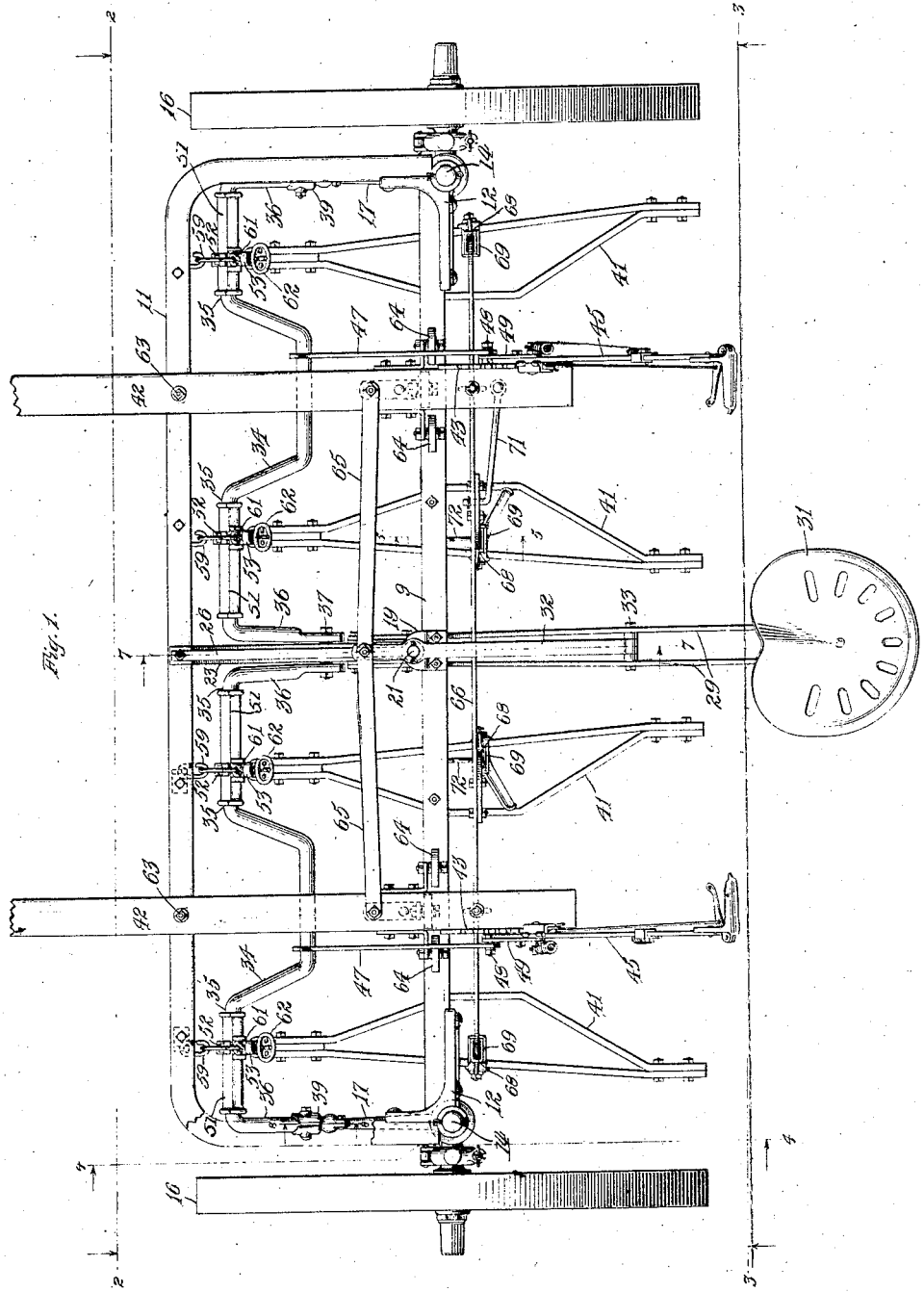

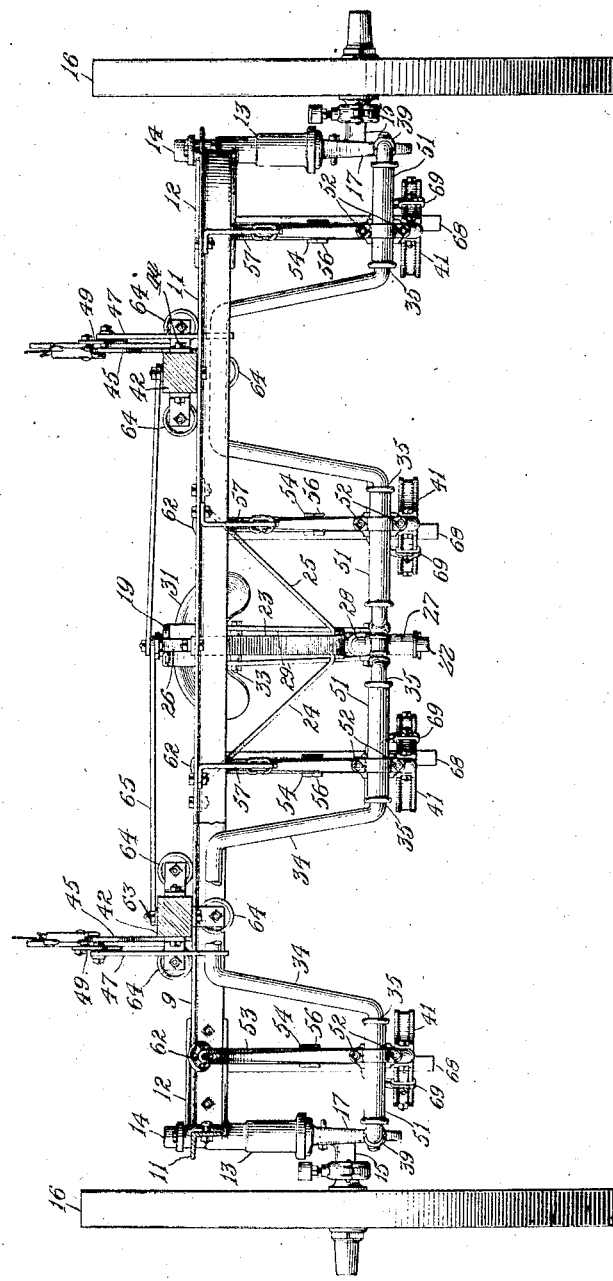

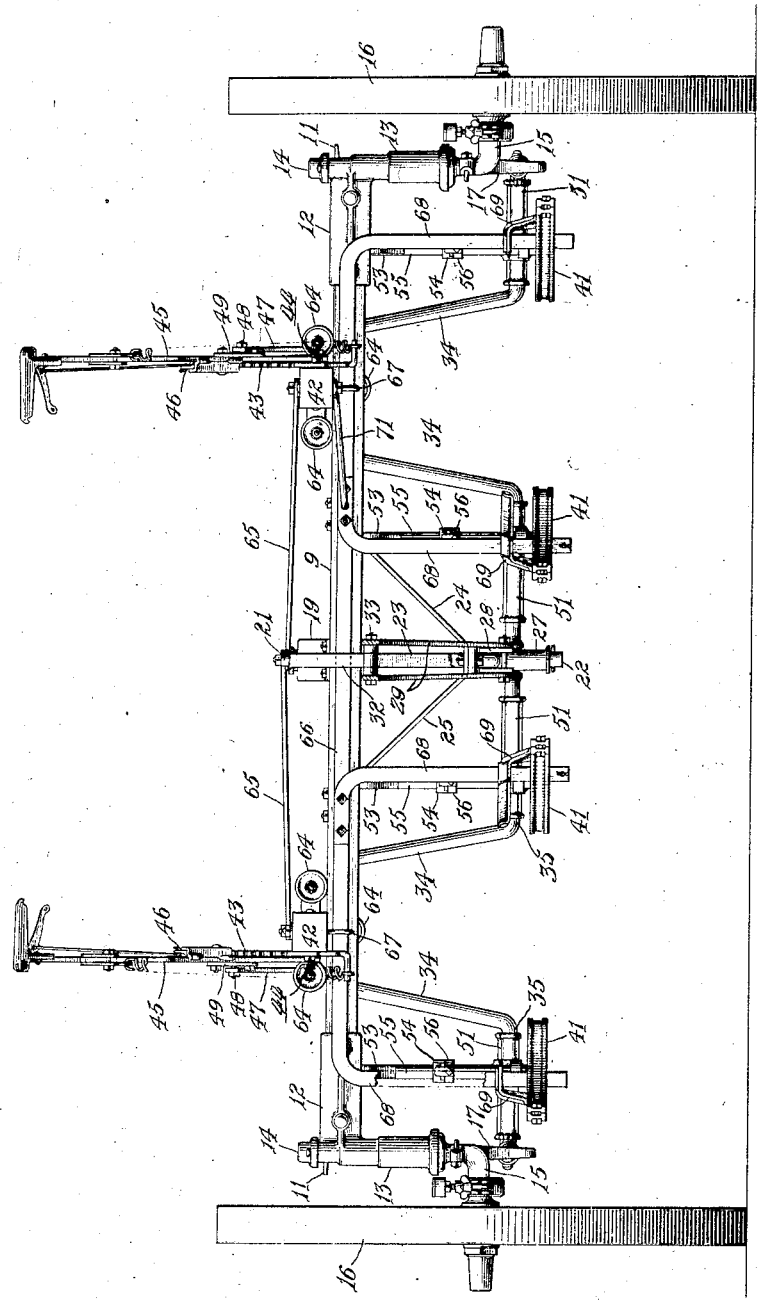

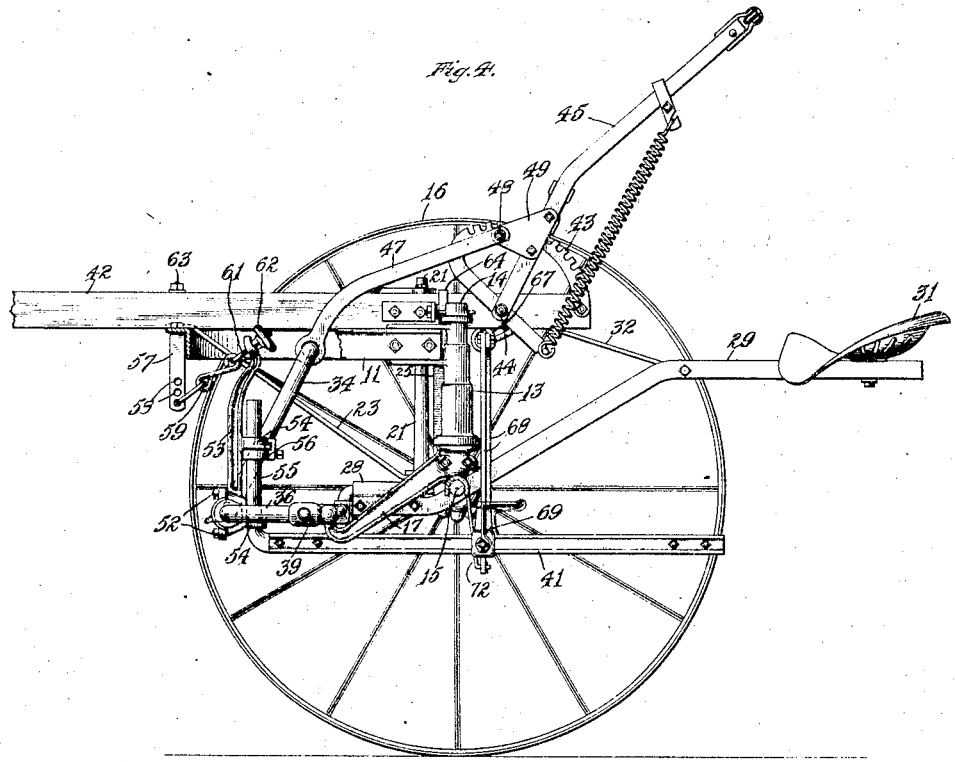

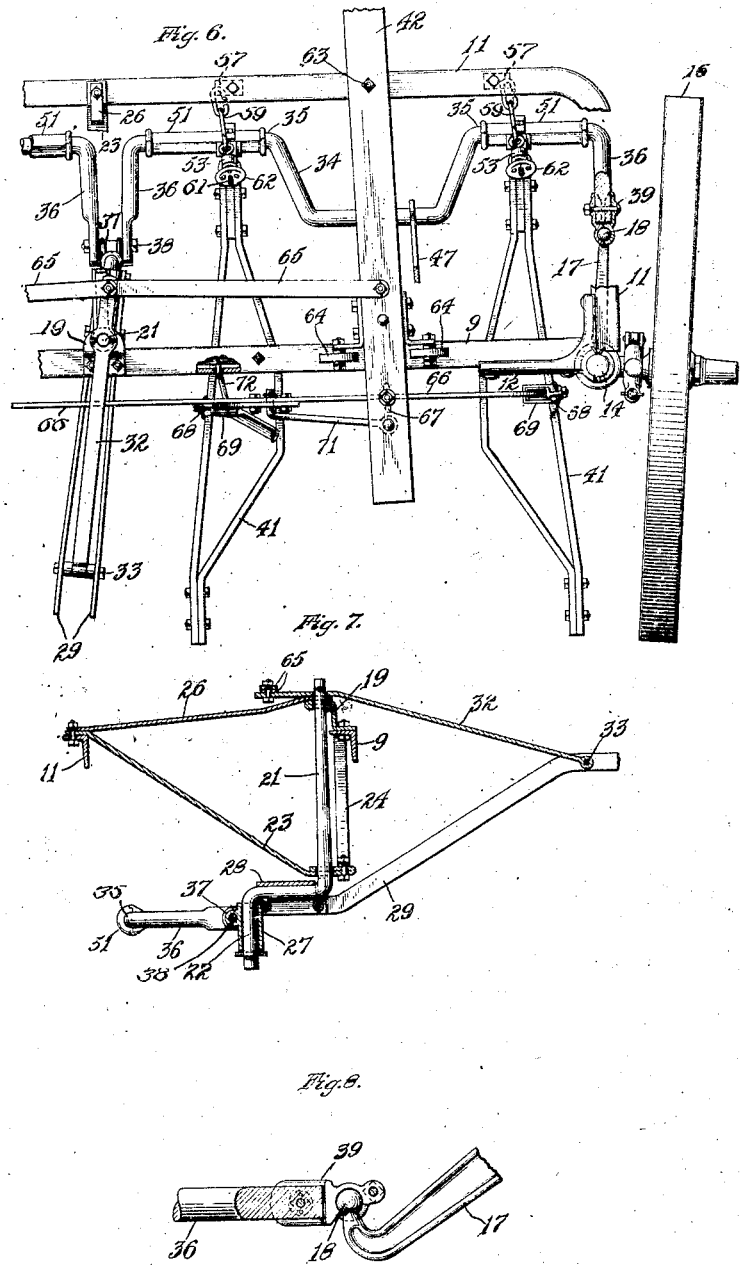

LEWIS E. WATERMAN, OF ROCKFORD, ILLINOIS, ASSIGNOR TO EMERSON-BRANTINGHAM COMPANY, OF ROCKFORD, ILLINOIS, A CORPORATION OF ILLINOIS.

TWO-ROW CULTIVATOR.

1,170,584.  Specification of Letters Patent.  Patented Feb. 8, 1916.

Application filed April 17, 1914. Serial No. 832,567.

*To all whom it may concern:*

Be it known that I, LEWIS E. WATERMAN, a citizen of the United States, residing at Rockford, in the county of Winnebago and State of Illinois, have invented certain new and useful Improvements in Two-Row Cultivators, of which the following is a specification.

This invention relates in general to cultivators and has more particular reference to what are commonly termed two-row cultivators adapted to cultivate a plurality of rows of corn or other growing plants at one operation.

One of the primary objects of this invention is the provision of a cultivator which can be easily manipulated and shifted by the operator so that the earth agitating devices may be made to follow the rows and can be quickly and easily shifted as occasion requires.

Another object of the invention is the provision of a cultivator in which the arches, to which the cultivator beams are attached, serve as a support for the beams, also as a connection between the wheels by means of which the wheels are maintained in parallelism, and by means of which they may be angled and also comprise a part of the lifting mechanism for raising and lowering the beams.

A further object is the provision of novel means for adjusting or leveling the beams vertically so that the various earth agitating devices carried by each beam will dig to the required depth relatively to the other devices on the same beam when the cultivator is in operation.

Another object is the provision of improved means for tilting the beams so as to elevate the rear ends thereof above the forward ends when the beams are raised to inoperative position.

A further object is to mount the poles on the cultivator frame in a novel manner and to connect them up with the beam and wheel shifting mechanism so that the beams and poles will be shifted and the wheels will be angled simultaneously from a common shifting device.

Other objects and many of the attendant advantages of the present invention will be apparent to those skilled in the art as the invention becomes better understood by reference to the following description when considered in connection with the accompanying drawings.

Referring to the drawings—Figure 1 is a plan view of a cultivator embodying my invention; Fig. 2 is a front view partially in section taken substantially on the line 2—2 of Fig. 1; Fig. 3 is a rear view of the machine taken on the line 3—3 of Fig. 1; Fig. 4 is a side elevation with the wheel removed, this view being taken on the line 4—4 of Fig. 1; Fig. 5 is a fragmentary sectional view on the line 5—5 of Fig. 1; Fig. 6 is a fragmentary plan view of the machine, certain parts being broken away to more clearly disclose the portions lying underneath; Fig. 7 is a transverse sectional view taken on the lin 7—7 of Fig. 1, and Fig. 8 is a detail view partially in section of the connection between the outer end of the yoke and its corresponding angling arm.

By reference to the drawings it will be observed that the main frame of the machine comprises a rear member 9, preferably formed of angle iron, and a front member 11 of substantially U-shape, also formed of angle iron and connected at its rear end with the rear member 9 through the intermediary of supporting brackets 12, of angle shape, rigidly bolted to the two members of the frame. Each supporting bracket is formed to provide a vertically disposed journal bearing 13 in which the vertical member 14 of a supporting standard is pivotally mounted to swing about the vertical axes. The lower end of each standard is formed to provide a laterally projecting axle 15 upon which a supporting wheel 16 is mounted and a forwardly projecting arm 17 which is preferably inclined downwardly, as shown in Fig. 4, and has its extremity upturned and provided with an integral ball 18 shown in Figs. 6 and 8. The arms 17 may be constructed integrally with the standards, if preferred, but in the form that I have shown for purposes of illustration the arms are clamped to the standards just above the axles 15 and are shaped to seat over the axles as shown in Fig. 4 so that a rigid connection between the arms and the standards is secured.

Upon the rear member 9 of the main frame I have mounted intermediate its ends, and preferably centrally thereof, a bracket 19 provided with an opening to receive the vertically disposed bearing portion 21 of a crank member which, as best shown in Fig. 7, is formed at its lower end to provide a crank 22 forwardly offset from the bearing portion 21. The lower end of the bearing portion 21 of the crank member is mounted in a depending frame comprising a forwardly extending brace 23 rigidly attached to the forward member 11 of the main frame at its front end and provided at its rear end with a bearing opening to receive the crank member. Lateral brace members 24 and 25 are bolted at their upper ends to the frame member 9 and at their lower ends to the brace 23. An upper brace 26 surrounding the crank member above the bracket 19 and attached at its forward end to the main frame member 11 serves to strengthen and lend rigidity to the crank member mounting. A bracket comprising a journaled portion 27 surrounding the crank 22, and a bridge portion 28 resting upon the horizontal arm of the crank member, is rigidly connected by bolts or other suitable means with seat supporting arms 29 carrying at their rear ends the seat 31. A link 32 connected at its rear ends with the arms 29 by bolt or pin 33 and pivotally associated with the upper end of the crank member 21 serves to sustain to a large extent the weight of the operator on the seat. It will be manifest that the seat is pivoted to swing about the bearing portion 21 of the crank member and that the crank 22 has a pivotal connection with the bracket to which the seat supporting members 29 are attached so that a limited relative movement between the bracket and the crank is afforded which permits lateral swinging movement of the crank about the bearing portion 21. The seat supporting members and the crank member associated therewith forms the main operating portion of the beam shifting and wheel angling mechanism, the other parts of which will now be described.

A pair of arches, designated generally by reference character 34, are each shaped to provide horizontal oppositely disposed portions 35 connected by the arch proper and terminating at their outer ends in rearwardly disposed portions 36 which are connected respectively with the standard arms 17 and the journaled portion 27 of the central bracket. It will be observed from Figs. 6 and 7 that the journal portion 27 is provided with a forwardly extending lug 37 to which the inner ends 36 of the arches are pivotally connected by a bolt 38. The outer portions 36 of the arches are equipped with socket members 39 which fit over the balls 18 of the standard arms 17 and provide a ball and socket connection between each arch and its respective standard. It will be manifest that the construction just described provides a connection between the standard arms at opposite sides of the machine which maintains the supporting wheels 16 in parallelism and that upon swinging movement of the seat support the arches will be shifted laterally in one direction or the other with respect to the main frame and through the intermediary of the arm 17 will impart this shifting movement to the wheels, with the result that the wheels will both be angled in the direction of movement of the arches. The cultivator beams 41, by which the earth agitating devices of any well known or preferred construction (not shown) are carried, are supported at their forward ends upon the horizontal portion 35 of the arches. The details of the means by which the beams are supported from the arches will be later described.

From the foregoing it will be obvious that the arches perform a dual function; namely, they support and carry with them in their lateral shifting movements the cultivator beams and also form a connection between the wheels by means of which the wheels are angled or shifted simultaneously with the shifting of the beams. The arches, however, have still a third and a very important function in that they serve in conjunction with other mechanism which will now be described as a means for raising and lowering the beams. At the rear end of each pole 42, to which the horses are attached, I have mounted a notched segment 43 and have pivoted upon a bolt 44 an operating lever 45 equipped with the usual manually controlled latch 46 adapted to engage in the notches of the segment 43. A link 47 is engaged at one end with the crown of an arch 34 and pivotally connected at its other end by a bolt 48 with a plate 49 secured to the lever 45. It will be manifest that the movement of the lever 45 rearwardly, or, in other words, in a clockwise direction, viewing Fig. 4, about its pivot 44, will swing the arch upwardly about its pivotal connections with the arm 17 and the journal bracket 27.

Sleeves 51 loosely embrace the horizontal portions 35 of the arches and upon each sleeve is clamped, by means of a clamping bolt 52, an upwardly projecting arm 53 provided with rearwardly disposed journals 54. The forward end of each beam is provided with an upstanding portion 55 pivotally engaged in the journals 54 and a clamping ring 56 secured to the upstanding portion 55 by a set screw interlocked with the upper journal 54 to support the beam in position. The beams are therefore pivoted to the arms 53 to swing in a horizontal plane.

In order to hold the beams in substantially vertical position, I have provided mechanism which will now be described. Upon the front frame member 11 I have secured substantially in alinement with each arm 53 a downwardly projecting member 57 provided with a plurality of apertures 58. The upper end of each arm 53 is also provided with an aperture and a link connection 59, including a bolt 61 passing through the upper end of the corresponding arm 53, which serves to hold said arm against rearward tilting movement. The hand nut 62 is adjustable thereon on the bolt 61 and this nut may be manually adjusted when the beams are in operative position to level the beams so that the earth agitating devices will be disposed in the same plane, or, if preferred, in an inclined plane to dig the required depth.

Fig. 4 illustrates the position of the parts when the bears are in operative position and it will be noted that the beam 41 shown is substantially horizontal while the arm 53 is substantially vertical. It will be obvious that by manipulating the nut 62 the rear end of the beam may be raised or lowered as required. This link connection between the arm 53 and the frame also serves the further purpose of elevating the rear end of the frame higher than the forward end when the beam is bodily raised through the instrumentality of the arch and the operating lever. It will be obvious from an inspection of Fig. 4 that as the arch is swung upwardly about its pivotal connections with the arm 17 and the central bracket 27 the arm 53 will be carried upwardly with the arch. The connection between the upper end of the arm 53 and the member 57 will, however, cause the upper end of the arm to swing forwardly relatively to the arch, which movement will elevate the rear end of the beam above the forward end. The connections are so proportioned and positioned that the normal movements of the beams upwardly and downwardly, for adjustment to various depths, will take place with the beams in substantially horizontal position but excessive raising of the beams, such as lifting them entirely out of the ground, will cause the rear end to tilt upwardly, thereby elevating the agitating devices sufficiently so that they will pass over stones, stumps or other obstructions.

In order to lend flexibility to the machine and render it easy to manipulate so that it can be shifted laterally with ease and rapidity the poles 42 are pivoted to the front member 11 of the main frame upon bolts 63 and a sliding connection between the poles and the rear member 9 is established, suitable guide-rollers 64 being provided both above and beneath the horizontal web of the rear frame member to reduce the friction and cause the poles to move easily along the frame. The movement of the poles is effected from the swinging seat supports through the brace 32 which projects forwardly beyond the bearing portion 21 of the bell crank member and is connected by links 65 with the poles disposed on each side thereof.

The beams are mounted in parallel relation with each other by means of a bail 66 slidably supported in loops or eyes 67 carried by the rear ends of the poles 42, the bail being equipped with downwardly extending arms 68 slidably engaging in eyes 69 secured to each beam. A link 71 attached at one end to the bail and at its other end to one of the poles serves to slide the bail laterally with the poles. Links 72 suspended from the frame member 9 are connected with the two central arms 68 to assist in supporting and guiding the same in their lateral shifting movements.

It will be manifest from the foregoing that I have devised a cultivator in which the arches serve as a connection between the wheels by means of which the wheels may be angled, also serve to support the beams, and furthermore, operate in conjunction with the hand levers to raise and lower the beams. The distance between the adjacent beams may be varied by loosening the clamping bolts 52 and sliding the arms 53 along the sleeves 51 to the required position.

It is believed that my invention and its mode of operation will be fully understood from the foregoing and it will be obvious that the invention is not circumscribed by the details disclosed for purposes of illustration, and that while the invention is embodied in the present instance as a two-row cultivator it is capable of adaptation to a single-row cultivator without departing from the spirit of the invention or sacrificing any of the material advantages thereof.

I claim:

1. In a cultivator, the combination of a frame, wheels pivoted on said frame to shift about vertical axes, an arch connected to and movable with said wheels, cultivator beams attached to said arch, and means for moving said arch to raise and lower said beams.

2. In a cultivator, the combination of a frame, a pair of supporting wheels shiftable about vertical axes, means including an arch connected with said wheels to maintain the same in parallel relation, cultivator beams carried by said arch, means for moving said arch laterally of the frame to shift said beams and simultaneously angle the wheels, and means for moving said arch vertically to raise and lower said beams.

3. In a cultivator, the combination of a frame, a pair of wheels mounted thereon to shift about vertical axes, an arm projecting forwardly from the vertical axis of each wheel and rigidly connected with the wheel axles, means connecting the forward ends of said arms, said means being shaped to provide an arch, cultivator beams carried by said arch, means for shifting said arch laterally to shift the position of the cultivator beams and simultaneously angle the wheels, and means operating on said arch to raise and lower said beams.

4. In a cultivator, the combination of a frame, standards pivotally mounted to swing about vertical axes at each side of said frame, supporting wheels mounted on said standards, an arm projecting forwardly from each standard, means including an arch pivotally attached to the forward end of each arm for connecting said arms, cultivator beams carried by said arch, and means for swinging said arch about its pivotal connections with said arms to raise and lower said beams.

5. In a cultivator, the combination of a frame, standards pivoted to each side of said frame, supporting wheels mounted on said standards, an arm fixedly secured to and projecting forwardly from each standard, means for connecting said arms, pivotally attached to the front end of each arm, to move vertically with respect to said arms, cultivator beams carried by said means, mechanism for moving said means laterally with respect to the frame to shift said beams and simultaneously angle the supporting wheels, and mechanism for swinging said means about its pivots to raise and lower said beams.

6. In a cultivator, the combination of a frame provided at each side with vertically disposed bearings, a standard pivoted in each bearing to swing about a vertical axis, an axle projecting laterally from each standard, supporting wheels mounted on said axles, an arm projecting forwardly from each standard, an arch pivoted to the forward end of each arm, a centrally disposed support to which the inner ends of said arch are pivotally connected, beams carried by said arch, and means for moving said central support laterally to shift the arch and simultaneously angle the wheels.

7. In a cultivator, the combination of a frame, supporting standards pivotally mounted at each side of said frame, wheels mounted on said standards, an arm projecting from each standard, a central support mounted medially on said frame, a pair of arches, each pivotally connected with said central support and with one of said arms, beams carried by said arches, means for shifting said support laterally to shift the arches and simultaneously angle said wheels, and means for swinging said arches vertically about their pivotal connection with said central support and said arms to raise and lower said beams.

8. In a cultivator, the combination of a frame, supporting standards mounted at each side thereof, wheels journaled on said standards, an arm projecting forwardly from each standard, an arch pivotally connected to the extremity of each arm, a crank arm pivoted medially on said frame, the inner ends of said arches being pivotally connected with said crank arm, and means for shifting said crank arm laterally about its pivot to shift said arches and simultaneously angle said wheels.

9. In a cultivator, the combination of a frame, standards pivoted to each side thereof, wheels mounted on said standards, an arm projecting forwardly from each standard, a crank arm pivoted to said frame intermediate its ends, a pair of arches, each pivotally connected to said crank arm and to a standard arm, beams carried by said arches, means for shifting said crank arm about its pivot to shift the arches laterally and simultaneously angle the wheels, and means for swinging said arches vertically about their pivots to raise and lower said beams.

10. In a cultivator, the combination of a frame, standards mounted at each side thereof to swing about vertical axes, wheels journaled on said standards, a centrally disposed crank arm pivoted on said frame, seat supporting means connected to said crank arm whereby said arm is shifted laterally with respect to the frame, connections between said arm and each of said wheels whereby said wheels are angled in parallelism upon shifting movement of the crank arm, and cultivator beams carried by said connections.

11. In a cultivator, the combination of a frame comprising a rear member and a front member, wheels mounted on said frame to move about vertical axes, a pole pivoted on the front member of said frame and movable laterally with respect to said rear member, a seat support pivoted medially on said frame, and means connecting said seat support with said pole and with said wheels whereby said pole and wheels are simultaneously shifted when the seat support is swung on its pivot.

12. In a cultivator, the combination of a frame, a pair of wheels pivoted thereon to shift about vertical axes, means including a pair of arches connecting said wheels, whereby the wheels are angled and maintained in parallel relation with each other, beams carried by said arches, a pair of poles pivoted on said frame, a swinging seat support connected with said arches, and connections between said seat support and said poles whereby, upon swinging movement of the seat support, the beams, poles and wheels are simultaneously shifted with respect to the frame.

13. In a cultivator, the combination of a frame, wheels pivoted thereon to swing about vertical axes, a pole pivoted on said frame, a seat support pivoted on said frame, beam supporting means and cultivator beams carried by said means, said wheels, beam supporting means and pole being connected with said seat support to be shifted with respect to the frame upon swinging movement of said seat support.

14. In a cultivator, the combination of a frame, supporting standards pivoted at each side of said frame, wheels journaled on said standards, each standard being provided with a forwardly projecting arm, a pair of arches, each having its outer end attached to one of said arms by a ball and socket connection, a crank arm pivoted medially on said frame, a bracket journaled on said arm, the inner end of each of said arches being pivotally connected with said bracket, seat supporting means attached to said bracket whereby said crank arm is swung about its pivot, cultivator beams carried by said arches, and means for moving said arches vertically to raise and lower said beams.

15. In a cultivator, the combination of a frame, a pivotally supported arch capable of vertical movement with respect to the frame, a cultivator beam carried by said arch and adapted to swing horizontally and vertically with respect to said arch, means for raising and lowering the arch and consequently the cultivator beam with respect to the frame, and means for varying the vertical position of the rear end of said beam with respect to the arch during said raising and lowering thereof.

16. In a cultivator, the combination of a frame, an arch comprising horizontal portions terminating in rearwardly extending arms pivotally supported at their extremities, an arm journaled on each horizontal portion of the arch, a cultivator beam attached to said arm to swing horizontally, and adjustable connections between said arms and said frame whereby the horizontal position of said beam may be regulated.

17. In a cultivator, the combination of a frame, an arch having horizontally disposed arms pivotally supported at their extremities, an arm journaled on said arch, a cultivator beam carried by said arm, adjustable connections between said arm and the frame whereby the position of the beams may be adjusted to level the cultivating devices, and means for actuating said arch to raise and lower the beam, the adjustable connection between said arm and said frame serving to elevate the rear end of the beam with respect to the forward end thereof after an initial upward movement of the beam has been effected.

18. In a cultivator, the combination of a frame, a pivotally supported arch, arms projecting upwardly from said arch, cultivator beams carried thereby, a link connection between the upper ends of said arms and said frame, and means for raising and lowering said arch on its pivot, the connection between said arms and said frame serving to tilt the arms and the beams upon raising movement of the arch to thereby elevate the rear ends of the beams higher than the forward ends.

19. In a cultivator, the combination of a frame, arms pivoted to said frame to swing laterally with respect thereto, an arch pivotally supported by said arms to move vertically with respect to the frame, a vertically disposed arm journaled on a horizontal portion of said arch, a cultivator beam having a vertically disposed member at its forward end pivotally attached to said arm, connections between the upper end of said arm and the frame, and means for adjusting said connections to level the beam in its operative position.

20. In a cultivator, the combination of a frame, arms pivoted on said frame to swing laterally with respect thereto, an arch pivoted to the extremities of said arms to swing vertically with respect to the arms, cultivator beams carried by said arch, means for swinging said arms to shift the arch and the beams carried thereby laterally with respect to the frame, means for raising and lowering said arch on its pivots to raise and lower the beams, and means for swinging said beams vertically with respect to the arch upon raising movement of the yoke, said last mentioned means being adjustable to level the beams when in operative position.

21. In a cultivator, the combination of a frame, means shiftable laterally with respect to the frame, a cultivator beam mounted pivotally on said means on a horizontal axis and having an arm extending above its pivot, means operable for raising and lowering said laterally shiftable means, and a connection between the upstanding beam-arm and the frame for guiding the cultivator beam as it is moved vertically so that its rear end will raise higher than its forward end and permitting the cultivator beam to be shifted laterally.

22. In a cultivator, the combination of a frame, supporting wheels mounted at each side of the frame to swing about vertical axes, laterally shiftable means connected with said wheels whereby the wheels are angled and maintained in parallelism, said means being movable vertically, cultivator beams attached to said means, a pole pivoted to the frame and being connected with said means whereby the pole is swung laterally by lateral movement of said means, and manually operable means carried by said pole and being connected to said laterally shiftable means for moving the same vertically to raise and lower the cultivator beams.

23. In a cultivator, the combination of a frame, wheels mounted at each side of the frame to swing laterally, a centrally disposed crank pivoted to the frame on a vertical axis and having its crank arm swingable laterally, a pair of arches each pivotally connected at one end with said swingable crank-arm, and at its other end with a wheel and having its bow portion located forward of its pivots to swing vertically therefrom, whereby the wheels are shiftable laterally by swinging the crank-arm laterally, beams carried by the arches, means for swinging the crank-arm laterally, and means for swinging the arches vertically.

24. In a cultivator, the combination of a frame, wheels mounted on vertical axes on the frame to swing laterally relatively to the line of draft, cultivator beam-supporting means connected with the wheels to swing laterally therewith, a pole mounted on the frame to swing laterally thereof, and means connecting the pole with the wheels for effecting, when the wheels are swung laterally, swinging of the pole laterally in a direction opposite to said swinging of the wheels.

25. In a cultivator, the combination of a frame, wheels mounted on vertical axes on the frame to swing laterally to the line of draft, laterally movable cultivator beam-supporting means, a pole pivoted intermediate its ends to the frame to swing laterally, means connecting the pole with the wheels to swing the pole laterally upon swinging of the wheels laterally, and manually operable means carried by the rear end portion of the pole and being connected to the beam-supporting means for moving the same vertically.

26. In a cultivator, the combination of a frame, a cultivator beam, an arm extending upwardly from the forward end of said beam, a connection between the upper end of said arm and said frame, and means for varying the vertical position of the forward end of said beam, said arm and the connection to the frame serving to tilt said beam about its forward end as a fulcrum during its vertical adjusting movements.

27. In a cultivator, the combination of a frame, a vertically movable beam-supporting member, a cultivator beam having its forward end pivotally supported on said member, an arm extending upwardly from the forward end of said beam, and connections between the upper end of said arm and said frame whereby said beam is swung in a vertical plane about said supporting member upon vertical movement of said supporting member.

28. In a cultivator, the combination of a frame, a beam-supporting member comprising a horizontal portion, a cultivator beam having its forward end pivotally supported on said horizontal portion, an arm connected with said beam and extending upwardly above the point of support of said beam, adjustable connection between the upper end of said arm and said frame whereby the beam may be adjusted vertically about said horizontal portion of the supporting member, and means for raising and lowering said supporting member, said arm and connection serving to tilt said beam about said supporting member upon raising and lowering motions thereof.

LEWIS E. WATERMAN.

Witnesses:
E. D. TIFFANY,
H. T. EVANS.